(Model.)
A. A. NOYES.
HORSE HAY RAKE.
No. 255,658.  Patented Mar. 28, 1882.
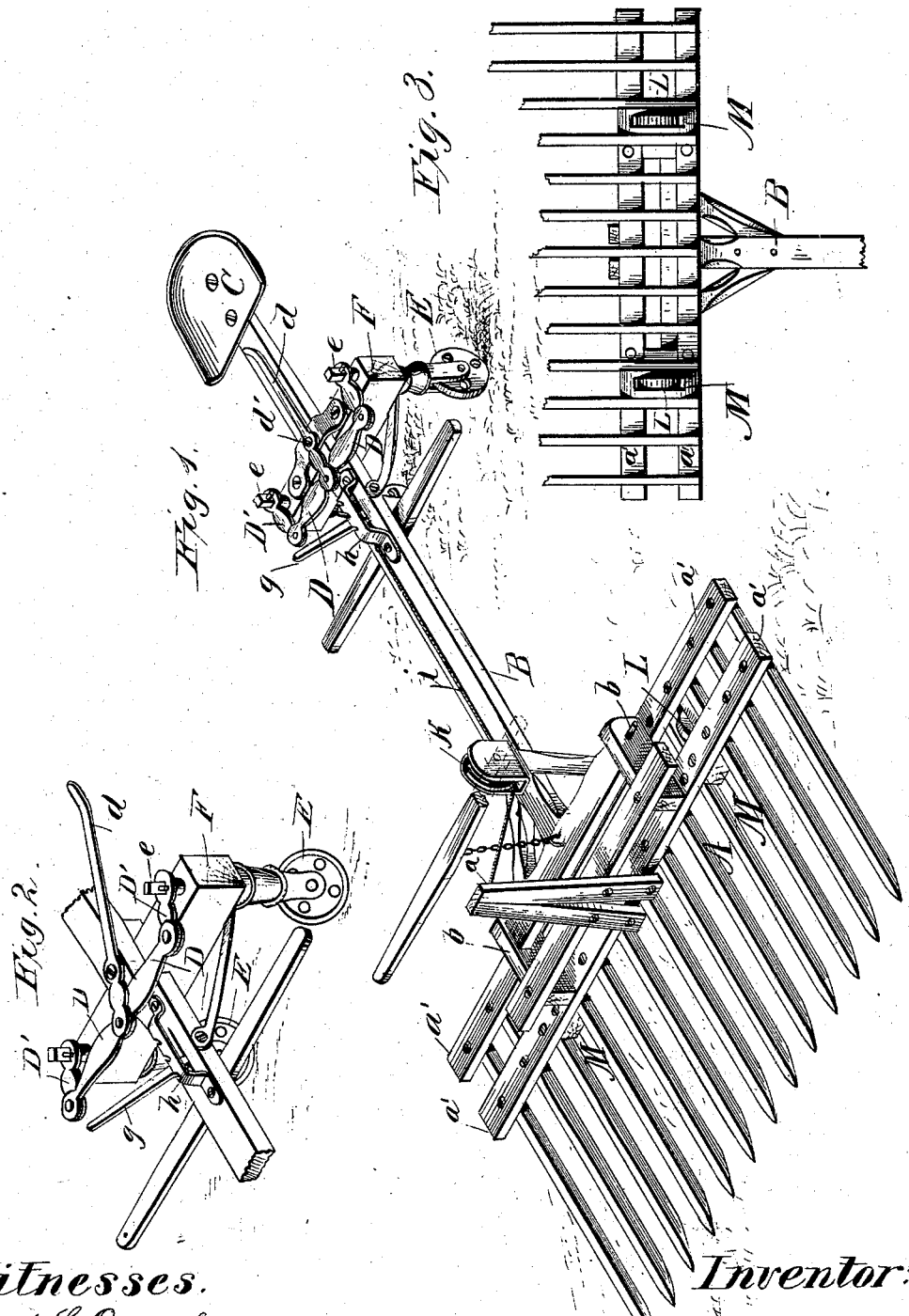
Witnesses.
Franck L. Ourand
George Cornell
Inventor:
Ashbel A Noyes
by L. Deane
his Atty.

UNITED STATES PATENT OFFICE.

ASHBEL A. NOYES, OF STEAMBOAT ROCK, IOWA.

HORSE HAY-RAKE.

SPECIFICATION forming part of Letters Patent No. 255,658, dated March 28, 1882.

Application filed November 3, 1881. (Model.)

*To all whom it may concern:*

Be it known that I, ASHBEL A. NOYES, a citizen of the United States, residing at Steamboat Rock, in the county of Hardin and State of Iowa, have invented certain new and useful Improvements in Horse Hay-Rakes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 is a perspective view of this device; Fig. 2, a detail to show the rear caster-wheel and levers more fully. Fig. 3 is a detail to show the peculiar way of fitting the rollers into the rake-head.

This invention belongs to that class of devices known as "horse hay-rakes;" and the novelty in the present instance consists in the rear caster-wheels and the system of levers by which the driver can direct the course of the rake, and in the general details of the construction and combination of all the parts, whereby a very easily worked, strong, and durable device is produced, all as will now be more fully and in detail set out and explained, reference being had to the accompanying drawings, in which—

A denotes the rake, which is hung on bearing-arms $b$ at the end of the shaft or pole B. At the other end of said pole is the driver's seat C, and in convenient relation to it is placed the handle $d$ of the levers D D'. This handle is pivoted at $d'$, and the arm D' of the levers is fixed on or secured to the upper end, $e$, of the shaft or shanks of the caster E, and this connection is made alike at each side. The casters are pivoted in the beam F by means of said shafts or shanks $e$, which extend up through them. By means of the handle $d$ the driver can readily place the wheels E at any desired angle, and so give any direction to the rake he may wish. The upwardly-extending handle $g$, which takes in the ratchet-piece $h$, so as to be held at any desired point, so operates the rake as to throw up the front end of the teeth by means of cord or chain $i$, attached to its end and passing under pulley $k$, and connecting to the post or standard $a$, which extends up from the rake-head. This movement of the rake is had on the bearing-arms $b$, before mentioned.

The wheels or rollers L under the head of the rake enable the rake to move with the greatest ease over the ground. They are properly mounted in the frame M, which is attached to the arms $a'$ $a'$ of the rake-head, and between two of the teeth—one wheel on each side of the rake. By this method of attaching the wheels or rollers L to the rake they will not come above the face of it, and so cannot catch in the hay thereon, and at the same time their lower edges are only so far below the under face as to bear up the rake from the ground. This method of fixing or attaching these wheels or rollers is very simple, cheap, and strong.

The manipulation of the rake, as well as of the casters or guide-wheels, is all very easily and effectively managed by the simple mechanism above described. This device has proved in use to be a great success, from the simplicity of its structure and the ease with which it is handled.

I am aware that heretofore a rear guide-wheel has been used in road-engines and other devices for the purpose of directing the course of the same, and therefore do not broadly claim such a feature.

Having thus described my invention, what I consider new, and desire to secure by Letters Patent, is:—

1. In a horse hay-rake, the rear guide, caster-wheels E, each having a shank, $e$, passing directly up through the outer end of the beam F, which is fixed to the pole B, near the seat C, and the double levers D D', connected with the heads of said shanks and operated by means of the handle $d$, pivoted to pole B, substantially as described.

2. The rake A, pivoted to the end of pole B, and having on each side of its head the frame M, fixed to the parallel bars $a'$ $a'$ of said rake and carrying the wheel or roller L, which does not project above said bars so as to interfere with the hay, and only sufficiently far below to give a bearing for the rake when it is moving on the ground, substantially as set forth.

In testimony whereof I affix my signature in presence of two witnesses.

ASHBEL ABNER NOYES.

Witnesses:
WATSON ROBERTS,
D. W. TURNER.